T. PHANEUF.
COOKER OR LUNCH BOX.
APPLICATION FILED MAY 6, 1919.
1,377,092.
Patented May 3, 1921.
2 SHEETS—SHEET 1.
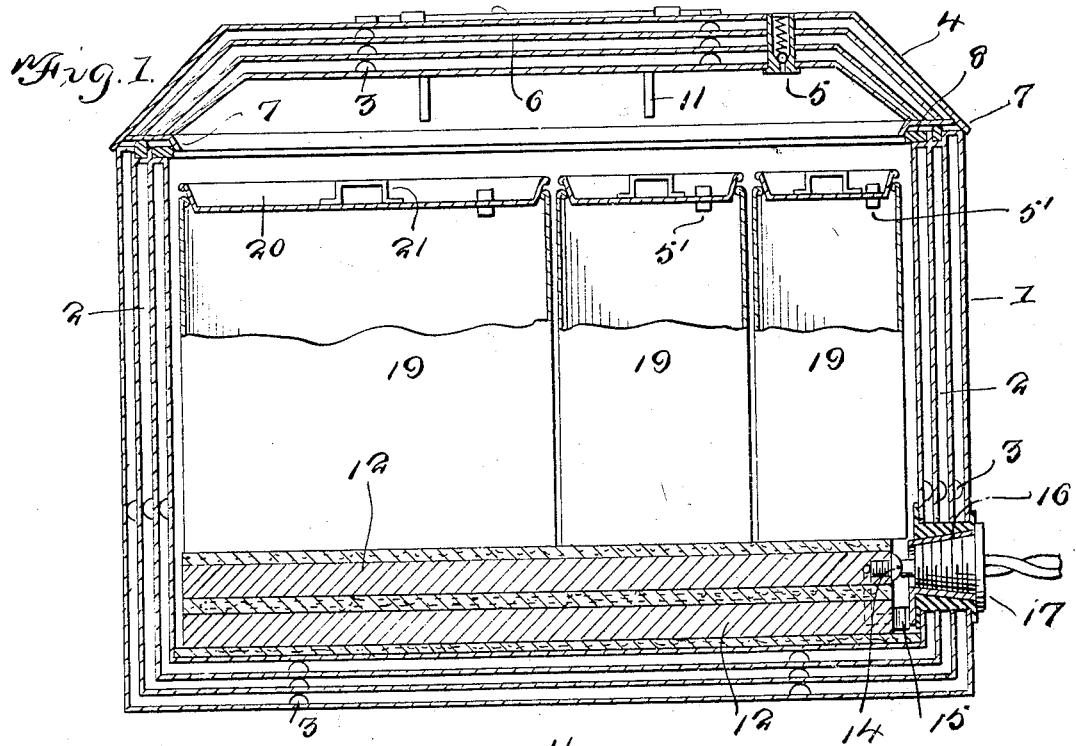
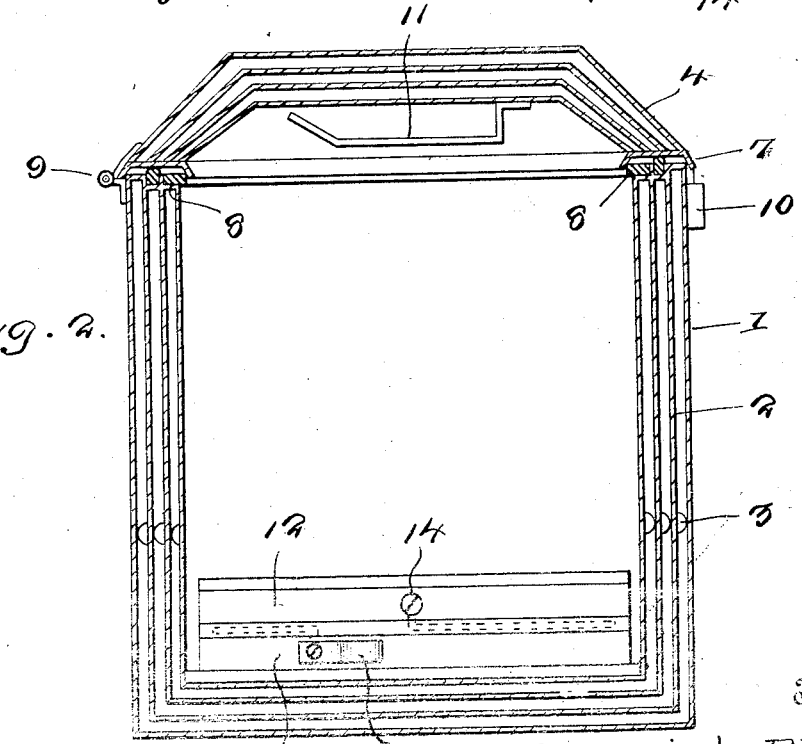
Inventor
Toussaint Phaneuf
By Victor J. Evans
Attorney
Witnesses
E. R. Ruppert

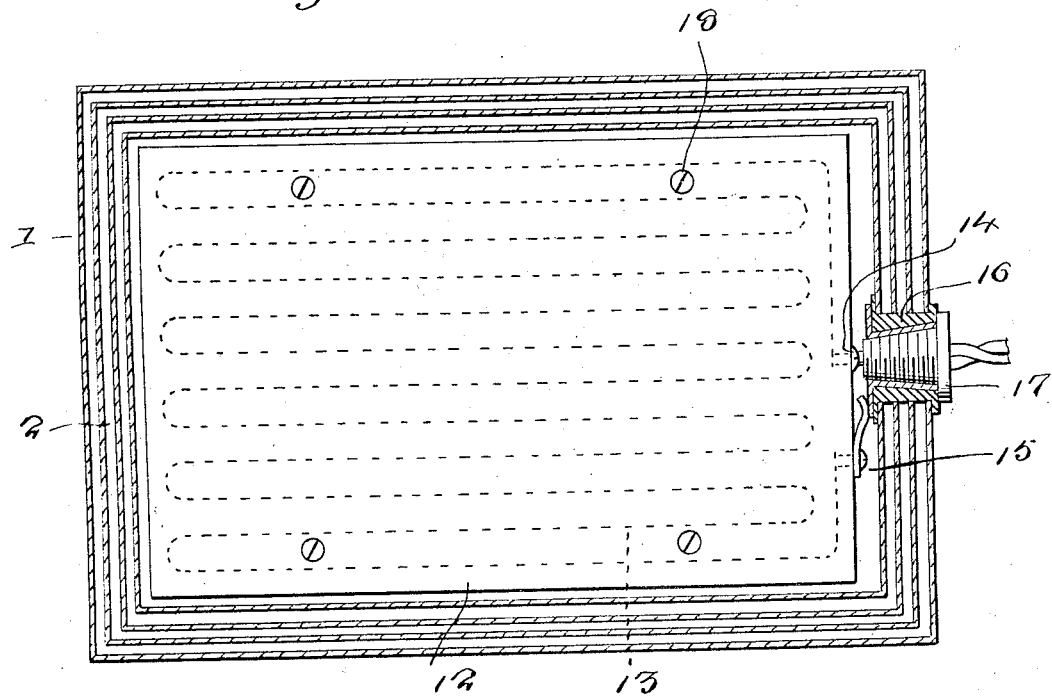
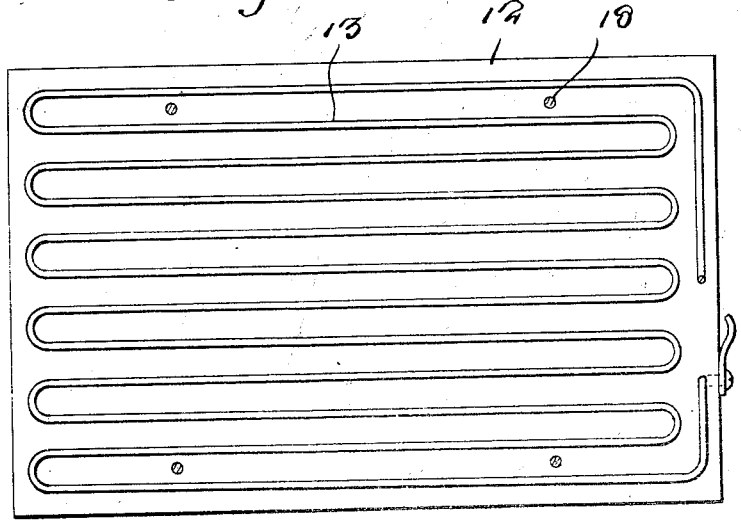
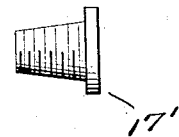

UNITED STATES PATENT OFFICE.

TOUSSAINT PHANEUF, OF NEWPORT NEWS, VIRGINIA.

COOKER OR LUNCH-BOX.

1,377,092.  Specification of Letters Patent.  Patented May 3, 1921.

Application filed May 6, 1919. Serial No. 295,073.

*To all whom it may concern:*

Be it known that I, TOUSSAINT PHANEUF, a citizen of the United States, residing at Newport News, in the county of Warwick and State of Virginia, have invented new and useful Improvements in Cookers or Lunch-Boxes, of which the following is a specification.

This invention relates to improvements in receptacles for cooking or keeping food warm and which may be used as a lunch box.

The principal object of the invention is to provide means whereby the food will be kept hot for a long time and, when desired, the device may be attached to an electric circuit for heating or cooking the food within the same.

Another object of the invention is to provide heat-retaining elements for the device which are provided with electric coils which are adapted to be connected with an electric circuit so that the elements may be heated thereby or said elements may be heated in any other way and placed in the device to form the same into a fireless cooker.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view of the invention;

Fig. 2 is a section taken at right angles to Fig. 1;

Fig. 3 is a horizontal sectional view;

Fig. 4 is a plan of one of the plates removed.

Fig. 5 is a view of the plug for filling the socket when the box is detached from the electric system.

In these views 1 indicates the casing which is composed of the four walls 2 which are spaced apart, as shown. Some of the walls are provided with the small projections 3 which engage the adjacent walls to hold the walls in spaced relation. The top 4 is also provided with the four walls some of which are provided with projections for spacing the walls apart. This top is also provided with the exhaust valve 5 and the handle 6. The edges of the top are provided with the flanges 7 for overlapping the top edge of the case and rubber insets 8 are located on the upper edge of the casing against which the top rests to form an air-tight connection. The top is connected with the case by the hinges 9 and the device may be provided with suitable catches or locks 10. The cover is provided with brackets 11 on its inner face for acting as a holder for knives, forks and spoons. Upon the inner bottom of the case rests a pair of heat-retaining elements 12 which may be plates of soapstone or the like. These plates carry between them electric coils 13, one end of which is fastened to the contact 14, and the other to the spring contact 15. A screw-threaded socket 16 is formed in one end of the case adjacent the contact 14 and when the usual plug 17 is placed in said socket it will make contact with said contact 14 while the other contact 15 will engage the wall of the socket. The plates are connected together by the screws or bolts 18 and these bolts support the plates so that the electric coils are out of contact with each other and with parts of the case. The plates may be covered with asbestos if desired. I provide a plain plug 17' for filling the socket when the coils are not in use.

I provide a number of containers 19 for containing various articles of food and these containers are adapted to fit within the case above the plates 12. They may be supported above said plates by flanges or the like. Each container is provided with a cover 20 and lifters 21 by which the containers may be removed from the case. These containers may also be provided with exhaust valves 5'.

It will thus be seen that the device may be used as an ordinary lunch box and by heating the plates before being placed in the box the food will be kept hot for a long time. If convenient, the coils may be connected up with an electric circuit so that the food may be reheated or in this case the device would act as a cooker.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A combined lunch box and cooker comprising a body composed of a plurality of walls spaced apart and a top composed of a plurality of walls spaced apart, means for hinging said top to the body, means for making a tight joint between the top and body, said body having an opening in one wall arranged for the reception of an electric plug, a stopper for closing said opening when the plug is removed, said body being constructed and arranged to receive a heat containing member carrying an electric coil for engagement with the plug, containers in the body, removable covers for the same and safety valves in said covers and in the top of the box.

In testimony whereof I affix my signature.

TOUSSAINT PHANEUF.